(12) United States Patent
Lin et al.

(10) Patent No.: US 9,682,484 B2
(45) Date of Patent: Jun. 20, 2017

(54) COUNTERBALANCE MECHANISM FOR END-EFFECTOR CONFIGURATION AND METHOD OF USE

(75) Inventors: Yhu-Tin Lin, Rochester Hills, MI (US); Andrew L. Bartos, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1560 days.

(21) Appl. No.: 12/756,215

(22) Filed: Apr. 8, 2010

(65) Prior Publication Data

US 2011/0017007 A1 Jan. 27, 2011

Related U.S. Application Data

(60) Provisional application No. 61/228,408, filed on Jul. 24, 2009.

(51) Int. Cl.
*B25J 15/04* (2006.01)
*B25J 19/00* (2006.01)
(Continued)

(52) U.S. Cl.
CPC ....... *B25J 15/0491* (2013.01); *B25J 15/0061* (2013.01); *B25J 9/104* (2013.01);
(Continued)

(58) Field of Classification Search
CPC .............. A61B 19/26; A61B 2090/506; A61B 2090/5025; A61B 2090/504; F16M 11/04; F16M 11/10; F16M 2200/044; F16M 2200/063; F16M 11/2021; F16M 11/18; G02B 7/001; Y10T 74/20305; B25J 19/0016; B25J 19/0008; B25J 19/002; B25J 15/0061; B25J 15/0052
USPC ........ 248/162.1, 648, 123.11, 125.2, 280.11, 248/284.1, 292.11, 292.12; 294/213, 65; 49/445, 386; 901/48, 30, 36; 269/60, 71,
(Continued)

(56) References Cited

U.S. PATENT DOCUMENTS 1,942,144 A * 1/1934 Fuller ........................... 254/334
3,172,632 A * 3/1965 Borg ............................ 248/201
(Continued)

OTHER PUBLICATIONS

Rahman, Tariq, et al., A Simple Technique to Passively Gravity-Balance Articulated Mechanisms, 1995, ASME.

*Primary Examiner* — Brian Mattei
*Assistant Examiner* — Taylor Morris
(74) *Attorney, Agent, or Firm* — Quinn IP Law

(57) ABSTRACT

A set-up stand is provided including a counterbalance mechanism for use in reconfiguring an end-effector with an articulating portion rotated by a bi-directional rotary locking device, for example, a clutch. A counterbalance mechanism is provided including a holding member which is attached to a preloaded member and connected to an articulating portion of the end-effector during reconfiguration of the end-effector. The preloaded member provides a tension load to counterbalance the gravity moment load of the articulating portion when the articulated portion is rotated in the same direction as the output shaft of the bi-direction rotary locking device, to prevent overhauling, chattering or binding stops during rotation and reconfiguration. A method is provided to utilize the counterbalance mechanism as described.

12 Claims, 4 Drawing Sheets

(51) Int. Cl.
   *B25J 15/00*   (2006.01)
   *F16M 11/20*   (2006.01)
   *B25J 9/10*    (2006.01)

(52) U.S. Cl.
   CPC .......... *B25J 15/0052* (2013.01); *B25J 19/002* (2013.01); *B25J 19/0008* (2013.01); *B25J 19/0016* (2013.01); *F16M 11/2021* (2013.01); *F16M 2200/044* (2013.01); *F16M 2200/063* (2013.01); *Y10T 74/20305* (2015.01)

(58) Field of Classification Search
   USPC ......... 269/75, 254 C, 55; 74/89.22; 108/136, 108/149, 145–147; 160/58.1, 81, 908; 414/719
   See application file for complete search history.

(56) References Cited

U.S. PATENT DOCUMENTS

| | | | | |
|---|---|---|---|---|
| 4,705,447 A * | 11/1987 | Smith | ...................... | B23Q 1/48 269/71 |
| 5,450,766 A * | 9/1995 | Holt | ................... | B23Q 1/4828 73/866.5 |
| 5,538,214 A * | 7/1996 | Sinila | ......................... | 248/278.1 |
| 6,056,499 A * | 5/2000 | Bressner | ...................... | 414/621 |
| 2005/0183533 A1* | 8/2005 | Tillmann | .................. | 74/490.03 |

\* cited by examiner

COUNTERBALANCE MECHANISM FOR END-EFFECTOR CONFIGURATION AND METHOD OF USE

CROSS-REFERENCE TO RELATED APPLICATIONS

This application claims the benefit of U.S. Provisional Patent Application No. 61/228,408 filed Jul. 24, 2009, and which is hereby incorporated by reference in its entirety.

TECHNICAL FIELD

This invention relates to a mechanism to counterbalance the gravity moment load of the articulating portion of a reconfigurable end-effector during set-up and adjustment.

BACKGROUND OF THE INVENTION

An end effector is a device connected to the end of a robot arm that interacts with the environment, for example, with an automotive body panel or windshield in an automotive assembly environment, to perform a task. The structure of an end effector and tooling or fixturing included as part of the end effector depends on the task the robot will be performing. The end-effector may include vacuum cup tool modules which are pneumatically actuated. The end effector may have articulating portions, such as an articulating frame, that allow the end-effector to be reconfigurable for different tasks. For example, an end effector with vacuum cup tool modules and an articulating frame can be reconfigured to pick and place automotive body panels and windshields of various configurations, providing flexibility in a manufacturing environment.

A reconfigurable end-effector with an articulating portion, such as an articulating frame, may use a bi-directional rotary locking device, or clutch, including an input shaft rotating an output shaft to rotate the articulating portion of the end-effector frame. However, unlocking the bi-directional clutch with the input shaft and output shaft rotating in the same direction creates the potential for an "overhauling effect" where the output shaft accelerates faster than the input shaft, causing the clutch to chatter or bind. The output shaft can be momentarily accelerated faster than the input shaft by introducing a pre-existing torque or moment load on the output shaft in the same direction as the intended rotation of the output shaft prior to release of the clutch. The pre-existing torque or moment load may be the gravity moment load of the articulating portion of the end effector frame, as the articulating portion rotates from a flat frame position to an articulated position.

A gravity counterbalance can be used to counteract the overhauling effect, and is typically comprised of an extension spring located in the direct tension load path to apply a tension load opposing the gravity moment load of the articulating portion. However, this typical concept of a gravity counterbalance is never perfectly balanced due to variability in the free length of the extension spring. If the spring stiffness is inadequate, the overhauling effect will continue to occur. If the spring is too stiff, the counterbalance will exert unnecessary resistance to the articulation effort.

SUMMARY OF THE INVENTION

A counterbalance mechanism to be used during the set-up and adjustment of a reconfigurable end-effector with an articulating frame that is rotated by a bi-directional rotary locking mechanism, or clutch, is provided. The counterbalance mechanism provides an opposing load to counteract the gravity moment load of the articulating portion of the end-effector frame as the articulating portion is rotated in the same direction as the input shaft of the clutch. Unless counterbalanced, the gravity moment load of the rotating end-effector frame may accelerate the rotation of the output shaft faster than the input shaft of the clutch, causing the clutch to "overhaul." This overhauling effect may include clutch chattering or binding stops.

The counterbalance mechanism of the present invention is attached to a set-up stand and to the articulating portion of the end-effector frame, and is actuated during rotation of the end-effector frame to provide a tension load counterbalancing the gravity moment load of the articulating end-effector frame as it is rotated either clockwise or counter clockwise to a reconfigured position. Counterbalancing the gravity moment load of the articulating portion of the end-effector frame during rotation reduces the torque load on the output shaft, and therefore reduces the potential for the output shaft to accelerate faster than the input shaft of the clutch, thereby minimizing clutch overhauling and preventing chattering or binding stops during the reconfiguration event.

Further, the present invention provides an advantage over typical counterbalance springs where variability in free length of a fixed end spring is detrimental to establishing a perfect counterbalance. In the present invention, a counterbalance mechanism is configured to position the spring out of the direct tension load path, and to preload the counterbalance to eliminate variability in free length of a fixed end spring of the counterbalance mechanism. Additional advantages of the present invention include the weight reduction and clearance advantages resultant from providing a counterbalance mechanism located on a set-up stand, and not on the end-effector.

Accordingly, a counterbalance mechanism is provided herein, configured to be attached to a set-up stand for an end-effector with an articulating portion rotated by a bi-directional rotary locking device. The counterbalance mechanism includes a preloaded member and a holding member. The holding member is in a first position prior to locating the end-effector on the stand, and in the first position the holding member is connected in tension to the preloaded member. The end-effector is located in the set-up stand and arranged in a first position by aligning locating features of the end-effector with locating fixtures on the set-up stand. In the first position, the articulating portion of the end-effector is generally upright as shown in the present invention, in the same plane as the non-articulating portion of the end-effector. This is also referred to as the flat frame or zero articulation position.

The holding member is connected to the articulating portion after the end-effector is located in the set-up stand in a first or flat frame position.

By rotating the input shaft, a bi-directional locking rotary device, such as a clutch, is released so that the articulating portion of the end-effector can be rotated by a rotational or output shaft, from a first position to a second position. The holding member moves from an initial position to a final position and remains continuously connected to the articulating portion during rotation of the articulating portion from a flat frame to an articulated position. The counterbalance load provided by the counterbalance mechanism is sufficient to offset the gravity moment load and prevent the rotational or clutch output shaft from rotating faster than the clutch input shaft, therefore minimizing any overhauling effect and preventing chattering or binding stops of the clutch during the reconfiguration event.

When the articulating portion has been rotated to the second, or articulated position, the bi-directional clutch is engaged by releasing the actuation on the input shaft to lock the articulating portion in position. The counterbalance holding member, while in the final position, is disengaged or detached from the articulating portion of the end-effector and returned to its initial position. The end-effector is removed from the set-up stand by a robot arm, completing the reconfiguration event.

This invention also includes a method for counter balancing an end-effector during reconfiguration of an articulating portion of the end-effector which is rotatable by a bi-directional rotary locking device from a first position to a second position. In one aspect the method comprises moving a holding member of a counterbalance mechanism attached to a stand into an initial position wherein the holding member is connected in tension to a preloaded member of the counterbalance mechanism, locating the end-effector on the stand in the first position, and operatively attaching the holding member to the articulating portion of the end-effector in the first position. The bi-directional rotary locking device is actuated to rotate the articulating portion of the end-effector from the first position to the second position, while concurrently the holding member moves from an initial position to a final position so that the preloaded member counter balances the gravity moment load of the articulating portion as the articulating portion rotates from the first position to the second position. The holding member, while in a final position, is then operatively detached from the articulating portion of the end-effector in the second position and the end-effector in a second position is removed from the stand. The method may further include manipulating an adjustable member of the preloaded member to vary the tension of the connection between the preloaded member and the holding member. The holding member may include an attachment portion that is actuable to operatively attach the holding member to, and detach the holding member from, the articulating portion of the end effector. The attachment portion may be a cylinder assembly including an actuable cylinder rod.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
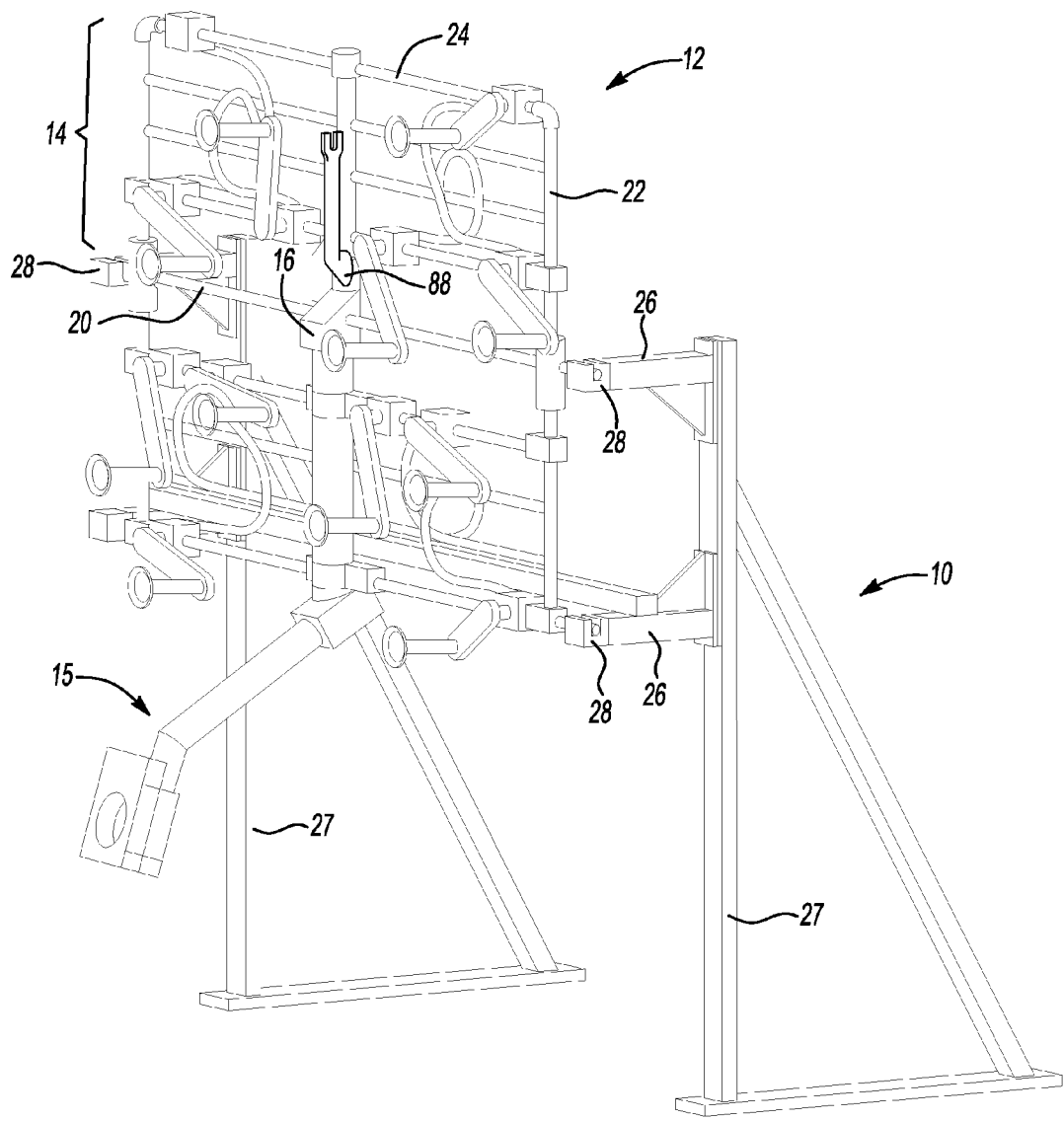
FIG. 1 is a schematic perspective view of an end-effector with an articulating frame in a flat frame position, on a set-up stand without a counterbalance mechanism.

Referring to the drawings wherein like reference numbers represent like components throughout the several figures, and beginning with FIG. 1, a stand, also referred to as a set-up stand, set-up fixture or fixturing stand, is generally indicated at 10. The stand 10 includes a leg 27 which is generally vertical with respect to the stand base, and may include other members configured to make stand 10 a freestanding unit or provide the structural strength and configuration required to support an end-effector such as the end-effector generally indicated at 12. Stand 10 may be connected by a transverse member of other means to another stand of same or different configuration to function as a set-up stand assembly or fixture assembly. Stand 10 includes one or more arms 26 shown in FIG. 1 attached to leg 27 in a generally horizontal orientation to provide a support surface upon which end-effector 12 can be located. One or more arms 26 may be oriented other than horizontally, as required to support other configurations of reconfigurable end-effectors during set-up. One or more arms 26 include one or more locating fixtures 28 configured to align with or be attached to one or more locating features 18 (see FIG. 2) on end-effector 12, to assist in properly locating end-effector 12 on set-up stand 10. Locating fixtures 28 may be of different configurations as required to be aligned with or attached to locating features 18 on end-effector 12.

The end-effector 12 includes a frame 22, one or more frame rails 24 and a connecting arm 15. The connecting arm 15 may be of any configuration connectable to a robot (not shown). Various fixtures and elements required for the operation and particular use of the end-effector, such as the vacuum cup tool modules and hose lines as shown in FIG. 1 for illustrative purposes only, may be mounted on frame 22 or frame rails 24. As shown in FIG. 1, the end-effector 12 is of a reconfigurable type and includes an articulating portion generally indicated at 14, and a rotational shaft 20 which defines an axis about which the articulating portion 14 rotates. The end-effector 12 includes one or more locating features 18, which may be features or elements of end-effector 12 which serve a functional purpose with respect to end-effector 12 and concurrently provide a locating feature 18, for example, the ends of rotation shaft 20 and the bottom corners of the end-effector frame 22 as shown in FIG. 1 provide locating features 18 located in alignment with locating fixtures 28 of stand 10.

Referring again to FIG. 1, end-effector 12 further includes a bi-directional rotary locking mechanism generally indicated at 16. The bi-directional rotary locking mechanism 16 may be a bi-directional clutch 16 that has both input and output shafts. The clutch mechanism 16 may be unlocked with simple mechanical or pneumatic means, for example, by releasing lever 88. By rotating the input shaft (not shown) with lever 88, the clutch 16 is unlocked and output shaft 20, also referred to as rotational shaft 20, is driven with equal amount of rotation in the same direction as the input shaft. When, however, there is a torque or moment load pre-existing on the output shaft 20 in the same direction as the intended rotation, e.g., in the direction of articulation of the articulating portion 14 of end-effector 24, an overhauling effect can result. In this situation, the actuation on the input shaft (not shown) will experience reaction from the pre-existing torque or moment load and result in chattering motion or binding stop.

The end-effector 12 is shown in FIG. 1 in a first position, where the articulating portion 14 is rotated to zero articulation or flat frame, that is, articulating portion 14 is in alignment with or in the same plane as the non-articulating portion of end-effector 12. No overhauling effect will result in this first position because the gravity moment load of articulation portion 14 is at zero. Further, movement of articulating portion 14 from an articulated position to a position of zero articulation will not produce an overhauling effect because the gravity moment load of articulating portion 14 during this rotation opposes the rotation of the rotational shaft 20 and therefore will not accelerate the rotation of the clutch output shaft 16 faster than the rotation of the clutch input shaft (not shown).

Figure 2:
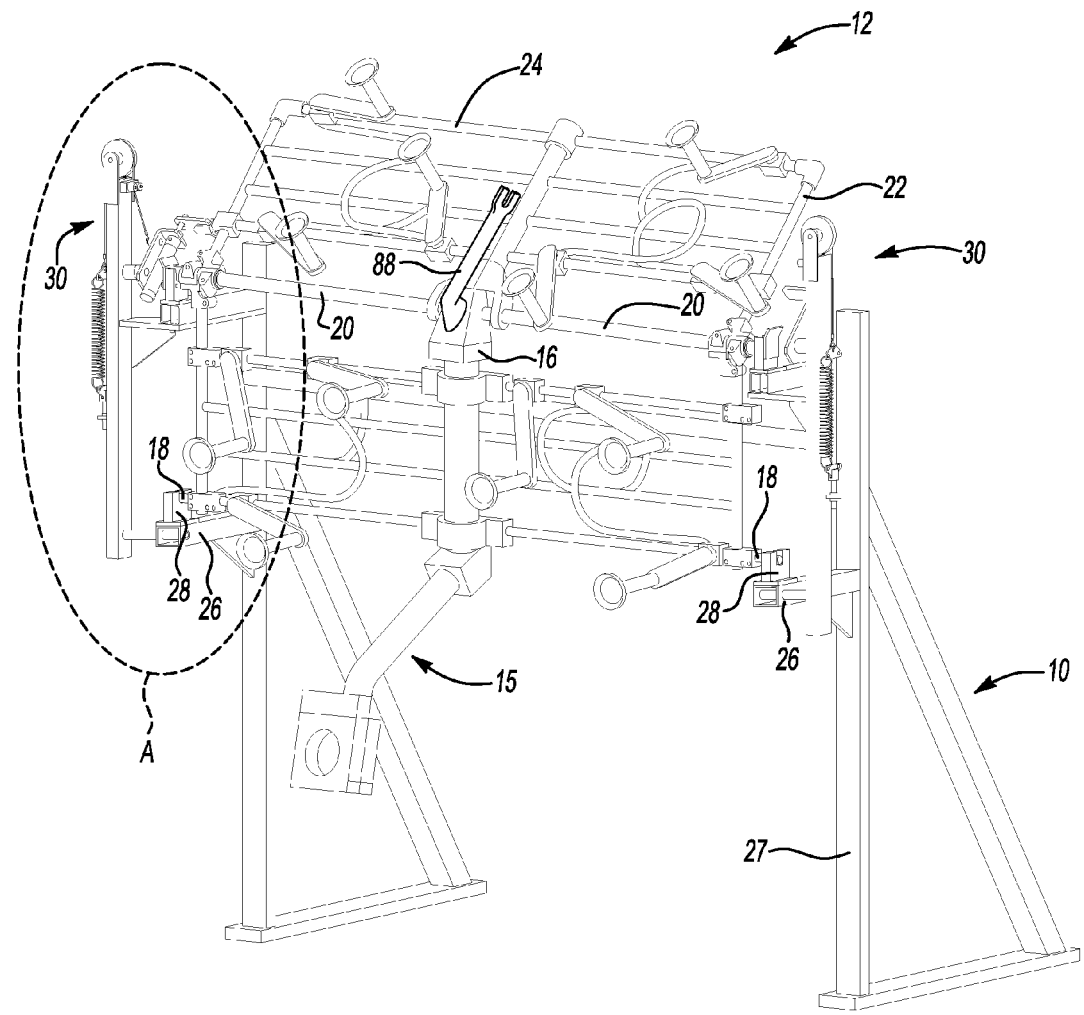
FIG. 2 is a schematic perspective view of an end-effector with an articulating frame in an articulated position, on a set-up stand including a counterbalance mechanism in accordance with the present invention.

Referring to FIG. 2, a set-up stand is generally indicated at 10, including generally vertical legs 27 and generally horizontal arms 26. Arms 26 include locating fixtures 28 which are aligned with locating features 18 of end-effector 12. End-effector 12 is shown in FIG. 2 located on stand 10 in an articulated position with articulating portion 14 rotated to a second position about the axis of rotational shaft 20 and positioned at an angle to flat frame or first position.

Referring to FIG. 2, a counterbalance mechanism is generally indicated at 30, with a counterbalance mechanism 30 attached to each set-up stand 10 in FIG. 2. Counterbalance mechanism 30 is attached to set-up stand 10 at arms 26, however counterbalance mechanism 30 may be attached at other locations on stand 10 as required for the particular configuration of the stand and the particular configuration and articulation features of the end-effector being set-up or reconfigured. Counterbalance mechanism 30 is shown in FIG. 2 in a second position and attached to articulating portion 14 of end-effector 12.

Figure 3:
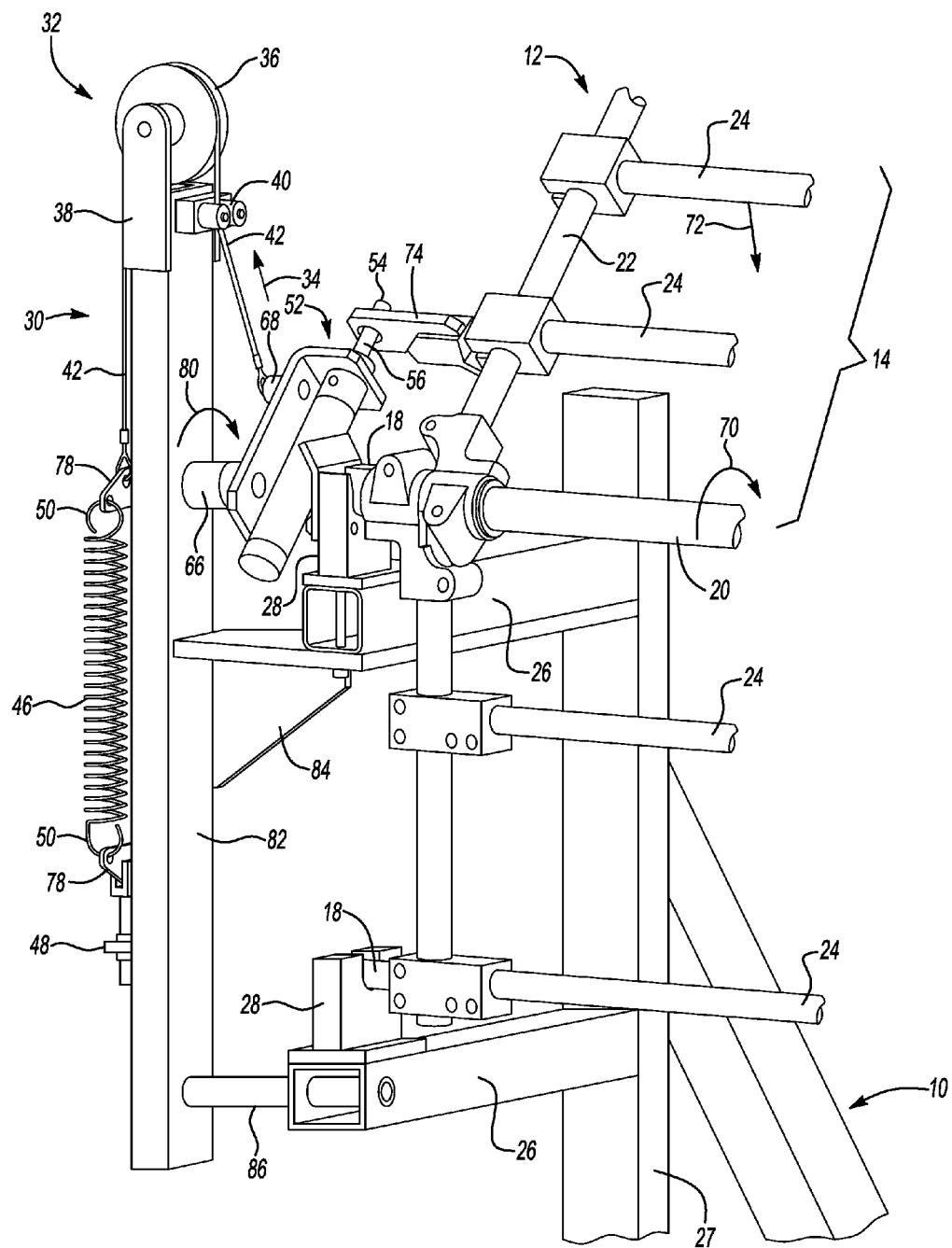
FIG. 3 is a schematic perspective view of the circled view A of FIG. 2, including a schematic view of a counterbalance mechanism in accordance with the present invention.

Referring now to FIG. 3, counterbalance mechanism 30 is shown in additional detail. Counterbalance mechanism 30 includes a preloaded member generally indicated at 32 and a holding member generally indicated at 52. The holding member 52 is shown in FIG. 3 in a final position and attached to articulating portion 14 of end effector 12, where articulating portion 14 is shown in a rotated, or articulated, position. In a initial position, holding member 52 is positioned in a generally vertical orientation, to be engageable with articulating portion 14 when articulating portion 14 is in a flat frame, zero articulation, or first position. Articulating portion 14 is shown in a flat frame, zero articulation position in FIG. 1.

Referring to FIG. 3, the counterbalance mechanism 30 is shown including the preloaded member generally indicated at 32 and the holding member generally indicated at 52. In the preferred embodiment shown in FIG. 3, preloaded member 32 and holding member 52 are operatively attached to support member 82, which may be fabricated from square, round or rectangular tubing, flat or angle channel, bar stock or similar material of the required strength and size to support the preloaded member 32 and holding member 52 in operation. In the preferred embodiment shown in FIG. 3, support member 82 includes attachment bracket 84 and attachment pin 86. Attachment bracket 84 and attachment pin 86 are fixedly attached to arms 26 of stand 10, thereby fixedly attaching counterbalance mechanism 30 to stand 10. Other means may be used to attach support member 82 to stand 10, including, for example, fastening by bolts or screws, bracketing or pinning with configurations other than those shown, or welding.

In an initial position, not shown here, holding member 52 is generally vertical, such that attachment portion 54 of holding member 52 can be attached to the articulating portion 14 of end-effector 12 when articulating portion 14 is in a first, or zero articulation, position. Holding member 52 is connected in tension to preloaded member 32, which minimizes variability in the free length of the spring member of preloaded member 30. Holding member 52 rotates to a final position in the direction of arrow 80.

Referring again to FIG. 3, shown in the preferred embodiment, preloaded member 32 includes a cable 42, a tensioner 36, a tensioner bracket 38, a spring 46, linkages 78, and an adjustable member 48. A cable guide 40, which may be, for example, a set of rollers or an eyelet screw, can also be attached to support member 82 to guide the travel path of cable 42. Adjustable member 48 may be, for example, a threaded nut type adjuster and is fixedly attached to support member 82. Spring 46 is an extension spring, also referred to as a tension spring, having spring ends 50 which may be loops or hooks suitable for attachment to linkages 78. Cable 42 is a tension cable having attachment ends 44 (shown in FIG. 4) operatively attached to spring linkage 78 at one end and to connection member 68 of holding member 52. Cable 42 travels over and in contact with tensioner 36. Tensioner 36 may be, for example, a pulley. Tensioner 36 is connected to support member 82 by tensioner bracket 38. Arrow 34 indicates the direction of the counterbalance load provided by the preloaded member.

Referring again to FIG. 3, holding member 52 is shown in final position operatively connected to articulating portion 14, where articulating portion 14 is shown in an articulated, or second, position. Holding member 52 includes an actuable portion 56 which can be actuated, for example, to be extended or contracted to respectively attach to and detach from articulating portion 14. Actuable portion 56 defines an attachment portion 54 which attaches to a receiving member 74 of articulating portion 14. Receiving member 74 may be a bracket, as provided in FIG. 3, with an opening 76 (see FIG. 4) for receiving an attachment portion 54. Additionally, for example, receiving member 74 may be, for example, an integral feature of articulating portion 14, an eyelet screw, plate, or other configuration as appropriate to receive and maintain an attachment with attachment portion 54 as articulating portion 14 is rotated from a first position to a second position in the direction of arrow 70, and holding member 52 moves from an initial position to a final position in the direction of arrow 80.

Figure 4:
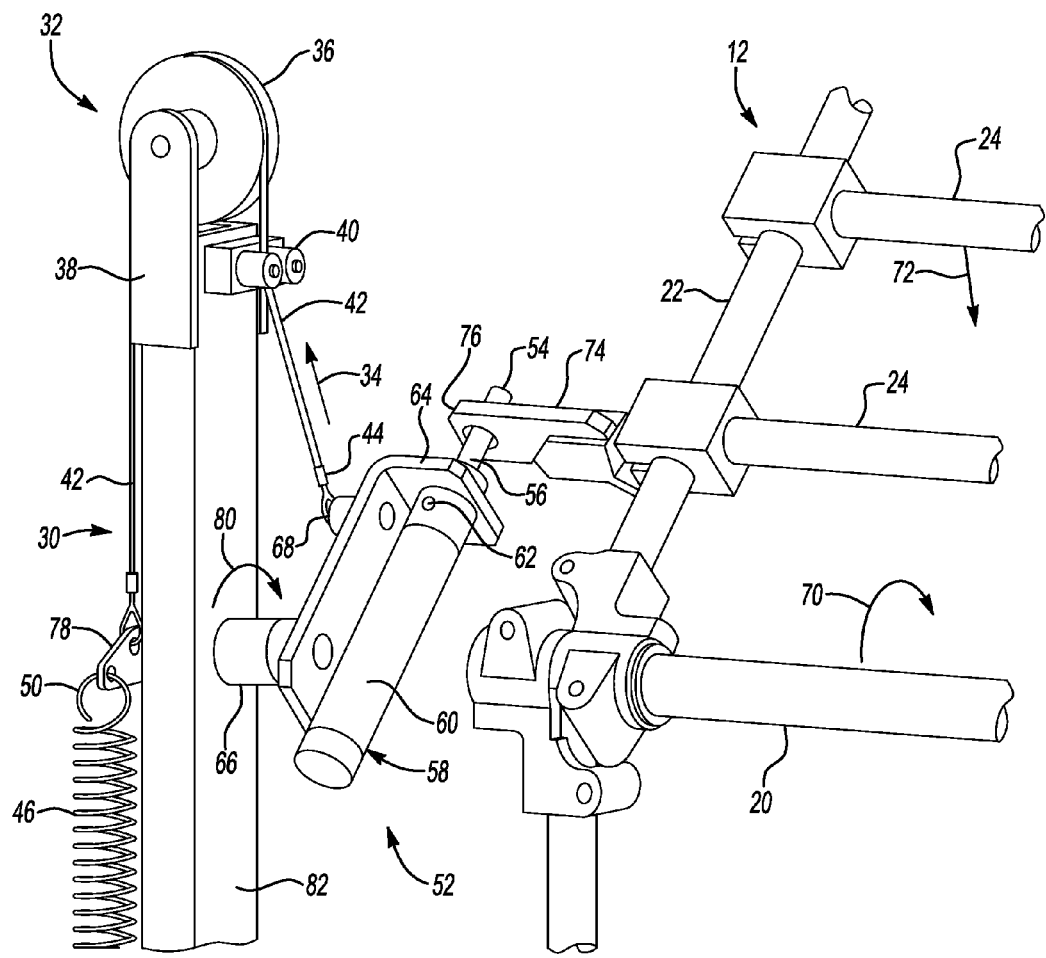
FIG. 4 is a schematic perspective partial view of the counterbalance mechanism of FIG. 3, in accordance with the present invention.

Referring now to FIG. 4, a preferred embodiment of holding member 52 is shown in additional detail. Holding member 52 is rotatably attached to support member 82 by a rotatable attachment 66, which may be, for example, a pivot pin attached to cylinder bracket 64 and to support member 82 by methods known to those skilled in the art. Holding member 52 includes a cylinder assembly 58 which is attached to cylinder bracket 64. Cylinder assembly 58 includes a cylinder 60 with an inlet port 62, an actuable portion 56, shown as a cylinder rod, and an attachment portion 54, shown as the end of cylinder rod 56. Attachment portion 54 of cylinder rod 56 may be of various configurations, for example, a hook, loop, threaded portion, or capped end as required to operatively connect attachment portion 54 to receiving member 74 of articulating portion 14. Receiving member 74 defines a receiving profile 76, shown in FIG. 4 as a through hole in bracket 74, to receive attachment portion 54. Receiving profile 76 may be of a different configuration, for example, recess, slot, hook, loop or other profile as required to operatively connect with attachment portion 54.

Referring again to FIGS. 2 and 3, depicted is a method of this invention, wherein an end-effector is counter balanced during reconfiguration of an articulating portion of the end-effector rotated by a bi-directional rotary locking device from a first position to a second position. End-effector 12 is reconfigured from a first position to a second position by initially locating end-effector 12 in set-up stand 10, aligning locating features 18 with locating fixtures 28, and releasing the robot arm (not shown) from end-effector 12. Prior to locating end-effector 12 in set-up stand 10, holding member 52 is moved to its initial position. Articulating portion 14 is rotated in a first position, also referred to as a zero articulation position or flat frame. Actuable portion 56 of holding member 52 is actuated and is connected with articulating portion 14. In the preferred embodiment, cylinder rod 56 is extended by compressed air or other pneumatic means such that cylinder rod end 54 extends through hole 76 to attach the holding member 52 to articulating portion 14.

By rotating the input shaft (not shown) through lever 88, bi-directional locking rotary clutch 16 is released and rotational output shaft 20 is rotated in the direction of arrow 70 to rotate articulating portion 14 from a first position to a second position. The second position is also referred to as the articulated position. Holding member 52 moves in the direction of arrow 80 from an initial position to a final position in complement with the rotational movement 70 of articulating portion 14, and remains continuously connected to the articulating portion 14 during the reconfiguration event. Cylinder rod 56 is extended as required during the reconfiguration sequence to maintain connection with receiving member 74. Articulating portion 14 produces a gravity moment load in the direction of arrow 72 as it is rotated, which is balanced by the counterbalance force of tension cable 42 in the direction of arrow 34. The counterbalance load provided by tension cable 42 and preloaded member 32 is sufficient to offset the gravity moment load of articulating portion 14, so that the rotational speed or acceleration of shaft 20 does not exceed that of the input shaft of clutch 16, thereby minimizing any overhauling effect and preventing chattering or binding stops during the reconfiguration event.

After articulating portion 14 has been rotated to a second position by releasing lever 88, bi-directional rotary locking clutch 16 is engaged to lock rotational shaft 20 and articulating portion 14 in the second position. With holding member 52 in final position, cylinder rod end 54 is retracted from receiving member 74. Holding member 52 is returned to its initial position. End-effector 12 is removed from set-up stand 10 by a robot arm (not shown), completing the reconfiguration event.

While the best modes for carrying out the invention have been described in detail, those familiar with the art to which this invention relates will recognize various alternative designs and embodiments for practicing the invention within the scope of the appended claims.

The invention claimed is:

1. A counterbalance mechanism comprising:
a stand;
a support member attached to the stand;
a preloaded member attached to the support member;
a holding member rotatably attached to the support member and rotatable between an initial position and a final position relative to the support member;
a cable attachment including a cable, a first end, and a second end;
the first end of the cable attachment attached to the holding member;
the second end of the cable attachment attached to the support member such that the holding member is connected in tension to the preloaded member by the cable attachment;
the stand including a plurality of arms arranged to removably receive a frame of an end-effector including an articulating portion; wherein the support member is attached to the stand such that, with the frame received by the plurality of arms, the holding member is selectively connectable to the articulating portion of the end-effector;
wherein the holding member includes an attachment portion which is selectively engageable with a receiving member of the end-effector.

2. The stand of claim 1, wherein:
at least one arm of the plurality of arms includes a locating fixture configured to removably receive a locating feature of the frame of the end-effector.

3. The stand of claim 1, wherein the support member is mounted to at least one arm of the plurality of arms.

4. The stand of claim 1, wherein the receiving member is attached to the articulating portion of the end-effector.

5. The stand of claim 1, further comprising:
wherein the holding member is continuously connected to the articulating portion as the holding member rotates between the initial position and the final position.

6. A method of counter balancing an end-effector using a counterbalance mechanism, the method comprising:
moving a holding member of the counterbalance mechanism into an initial position;
wherein the counterbalance mechanism comprises:
a stand;
a support member attached to the stand;
a preloaded member attached to the support member;
a holding member rotatably attached to the support member and rotatable between an initial position and a final position relative to the support member;
a cable attachment including a cable, a first end, and a second end;
wherein:
the first end of the cable attachment attached to the holding member; the second end of the cable attachment attached to the support member such that the holding member is connected in tension to the preloaded member by the cable attachment;
the stand including at least one arm configured to removably receive a frame of an end-effector, the end-effector including an articulating portion rotatable from a first position to a second position;
the method further comprising:
receiving the frame portion of the end-effector with the articulating portion in the first position on the at least one arm;
operatively attaching the holding member to the articulating portion with the articulating portion in the first position;
moving the holding member between the initial position and the final position so that the preloaded member counter balances a gravity moment load of the articulating portion as the articulating portion is rotated from the first position to the second position; and
operatively detaching the holding member from the articulating portion of the end-effector in the second position prior to removing the end-effector with the articulating portion in a second position from the stand.

7. The method of claim 6, further comprising:
manipulating an adjustable member of the preloaded member to vary the tension of the connection between the preloaded member and the holding member.

8. The method of claim 6, further comprising:
actuating an attachment portion of the holding member to operatively attach the holding member to the articulating portion of the end-effector in the first position; and actuating the attachment portion of the holding member to operatively detach the holding member from the articulating portion of the end-effector in the second position.

9. The method of claim 8, wherein actuating the attachment portion of the holding member includes actuating a cylinder assembly including an movable cylinder rod.

10. The method of claim 6, further comprising:
attaching an attachment portion of the holding member to a receiving member attached to the articulating portion of the end effector.

11. The method of claim 6, wherein:
wherein:
the holding member includes an actuable element actuable to operatively attach the holding member to the articulating portion;
the actuable element is actuable between a non-engaged position and an engaged position relative to the holding member;
the method further comprising:
operatively attaching the holding member to the articulating portion with the articulating portion in the first position by actuating the holding member to the engaged position to attach the holding member to the articulating portion; and
moving the holding member between the initial position and the final position with the actuable element continuously actuated to the engaged position.

12. The method of claim 6, wherein the support member is mounted on the at least one arm.

* * * * *